United States Patent
Nakiranda

(10) Patent No.: US 9,420,077 B1
(45) Date of Patent: Aug. 16, 2016

(54) COMBINED CELLULAR TELEPHONE AND WRIST WATCH AND ASSOCIATED USE THEREOF

(71) Applicant: Florence Nakiranda, Plainfield, IL (US)

(72) Inventor: Florence Nakiranda, Plainfield, IL (US)

( * ) Notice: Subject to any disclaimer, the term of this patent is extended or adjusted under 35 U.S.C. 154(b) by 3 days.

(21) Appl. No.: 14/464,660

(22) Filed: Aug. 20, 2014

Related U.S. Application Data

(60) Provisional application No. 61/867,656, filed on Aug. 20, 2013.

(51) Int. Cl.
| | | |
|---|---|---|
| *H04M 1/00* | (2006.01) | |
| *H04M 1/21* | (2006.01) | |
| *H04M 1/04* | (2006.01) | |

(52) U.S. Cl.
CPC . *H04M 1/21* (2013.01); *H04M 1/04* (2013.01)

(58) Field of Classification Search
CPC ........... H04B 1/385; H04M 1/21; H04M 1/04
USPC .................. 455/550.1, 556.1, 575.1
See application file for complete search history.

(56) References Cited

U.S. PATENT DOCUMENTS

| | | | | |
|---|---|---|---|---|
| 6,718,187 | B1 * | 4/2004 | Takagi | G02B 27/01 379/420.01 |
| 8,391,934 | B1 * | 3/2013 | Chan | H04M 1/0254 455/550.1 |
| 2002/0177928 | A1 * | 11/2002 | Moriguchi | H04M 1/6091 701/1 |
| 2005/0255874 | A1 * | 11/2005 | Stewart-Baxter | H04M 1/6075 455/550.1 |
| 2009/0029675 | A1 * | 1/2009 | Steinmetz | H04K 3/415 455/410 |
| 2009/0069045 | A1 * | 3/2009 | Cheng | H02J 7/0042 455/556.1 |
| 2011/0021234 | A1 * | 1/2011 | Tibbitts | H04W 48/04 455/517 |
| 2011/0151842 | A1 * | 6/2011 | Olincy | H04M 3/42348 455/414.1 |
| 2013/0217445 | A1 * | 8/2013 | Chan | H04M 1/0254 455/566 |

* cited by examiner

*Primary Examiner* — Ayodeji A Ayotunde

(57) ABSTRACT

A combined cellular telephone and wrist watch including a wrist watch having a housing provided with a fixed and rigid shape, and a flexible wrist band attached to the housing; and a cellular telephone located at the housing and spaced from the wrist band. A user of the cellular telephone is permitted to selectively generate, send and receive text and telephone messages while the cellular telephone is at the manual response operating mode (not within an operating vehicle). Conversely, a user of the cellular telephone is prohibited from selectively generating, sending and receiving text and telephone messages while the cellular telephone is at the automatic response operating mode (within an operating vehicle).

3 Claims, 4 Drawing Sheets

COMBINED CELLULAR TELEPHONE AND WRIST WATCH AND ASSOCIATED USE THEREOF

CROSS REFERENCE TO RELATED APPLICATIONS

This application claims the benefit of U.S. Provisional Application No. 61/867,656 filed Aug. 20, 2013, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

1. Technical Field

Exemplary embodiment(s) of the present disclosure relate to cellular telephones and, more particularly, to a cellular telephone, cleverly incorporated into the design of a wearable wristwatch. A pendent style is also considered. Equipped with a rapid message delivery system, as well as other practical features, the design intent is to provide a multifunctional time piece which would enable consumers a discreet, yet readily available means of monitoring their cellular activity and communicating with others.

2. Prior Art

For over 125 years, telecommunications have played an important role in American society. Ever improving, today's telephones are in fact mini-computers, possessing the ability to tell us who is calling, from what number and automatically returning the call with a push of a button. Although consumers will always have telephones in their homes, the desire to have a telephone on hand at all times has spawned the booming market of cellular communications.

Today, people are using cellular and digital telephones for multitasking activities such as getting stock quotes, e-mailing friends, transmitting computer files, paging, checking traffic and weather reports, "surfing" the Internet, and making phone calls while on-the-go. Compact in size, most cellular telephones can fit in a briefcase, purse or pocket with ease. The popularity of cell phones has enjoyed phenomenal growth in recent years. In fact, it is estimated that in the United States alone, over 140 million people have "gone wireless." The benefits of owning a cellular telephone have never been disputed. Providing stranded motorists with a means of calling for help, offering frequent travelers a means of staying in contact with loved ones, closing deals while on the road, and allowing giggling teenagers to gossip while shopping at the mall, cellular telephones are an indispensable tool that millions would rather never be without.

With the increased dependence on cellular telephone technology, it is important to consumers to find more practical and convenient ways to use these necessary devices. Specifically, most cellular users recognize that it is rude to talk on their phone while at the gym, in a movie, or when attending a business meeting. As such, most conscientious users turn their phone's ringer off and store the phone away when engaged in such activities. Unfortunately, if one's phone is not on hand, one may miss an important phone call or text message sent via the cellular telephone. As can be imagined, continuously pulling out one's phone to check for missed calls or messages when engaged in a meeting or other activity is simply not an option for the courteous cellular subscriber. Exiting a meeting or work event and finding that one has missed a half a dozen calls from a child who needs picked up at school, or a wife who has gone into labor, is not only frustrating to the cellular subscriber, but can also have detrimental consequences to the caller.

Accordingly, a need remains for a convenient cellular telephone in order to overcome at least one prior art shortcoming. The exemplary embodiment(s) satisfy such a need by providing a cellular telephone, cleverly incorporated into the design of a wearable wristwatch. A pendent style is also considered. Equipped with a rapid message delivery system, as well as other practical features, the design intent is to provide a multifunctional time piece that is convenient and easy to use, lightweight yet durable in design, versatile in its applications, and designed for enabling consumers a discreet, yet readily available means of monitoring their cellular activity and communicating with others.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a combined cellular telephone and wrist watch. These and other objects, features, and advantages of the non-limiting exemplary embodiment(s) are provided by a combined cellular telephone and wrist watch including a wrist watch having a housing provided with a fixed and rigid shape, and a flexible wrist band attached to the housing; and a cellular telephone located at the housing and spaced from the wrist band.

In a non-limiting exemplary embodiment, the cellular telephone includes a processor located at the housing, a SIM card communicatively coupled to the processor and located within the housing, an antenna communicatively coupled to the processor and located at the housing, a rechargeable battery communicatively coupled to the processor and located at the housing, a touch screen panel communicatively coupled to the processor and located at the housing, an alphanumeric keypad communicatively coupled to the touch screen panel and processor and located at the housing, and a microphone and speaker system which communicatively coupled to the processor and located at the housing.

In a non-limiting exemplary embodiment, the cellular telephone further includes a plurality of vehicle operating parameter sensors adapted to be in communication with an existing onboard vehicle diagnostic device, and a cellular telephone operating mode switch in communication with the vehicle operating parameter sensors.

In a non-limiting exemplary embodiment, the cellular telephone further includes a memory in communication with the processor and including a computer-executable control logic algorithm for blocking outgoing calls and texts when a user wearing the combined cellular telephone and wrist watch is located within a vehicle having certain operating parameters. Such a control logic algorithm includes the chronological steps of: the vehicle operating parameter sensors detecting, from the vehicle diagnostic detection device, whether an engine of the vehicle is on or off; the vehicle operating parameter sensors detecting, from the vehicle diagnostic detection device, whether the vehicle is in a parked gear; if the vehicle engine is off, the sensors generating and transmitting a first signal to the cellular telephone operating mode switch thereby toggling the cellular telephone to a manual response operating mode; and if the vehicle engine is on and the vehicle is in the parked gear, the sensors generating and transmitting the first signal to the cellular telephone operating mode switch thereby toggling the cellular telephone to the manual response operating mode; and if the vehicle engine is on and the vehicle is not in the parked gear, the sensors generating and transmitting a second signal to the cellular telephone operating mode switch thereby toggling the cellular telephone to an automatic response operating mode. In this manner, a user of the cellular telephone is permitted to selectively generate, send and receive text and telephone messages while the cellular telephone is at the manual response operating mode. Conversely, a user of the cellular telephone is prohibited from selectively generating, sending and receiving text and telephone messages while the cellular telephone is at the automatic response operating mode.

The present disclosure further includes a method of utilizing a combined cellular telephone and wrist watch, the method including the chronological steps of: providing a wrist watch including a housing having a fixed and rigid shape, and a flexible wrist band attached to the housing; providing and locating a cellular telephone at the housing; and spacing the cellular telephone from the wrist band.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
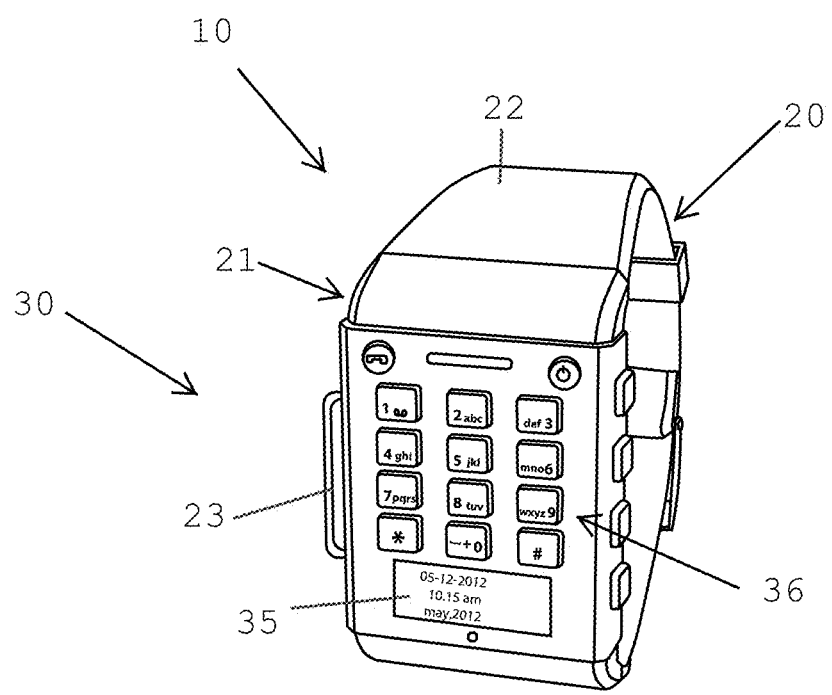
FIG. 1 is a perspective view of a combined cellular telephone and wrist watch, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 2:
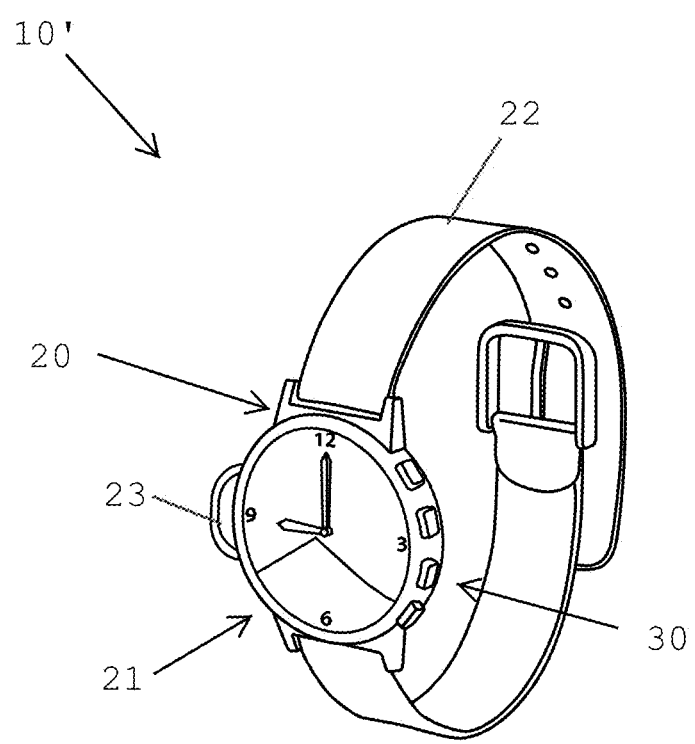
FIG. 2 is a perspective view of a combined cellular telephone and wrist watch, in accordance with another non-limiting exemplary embodiment.
Figure 3:
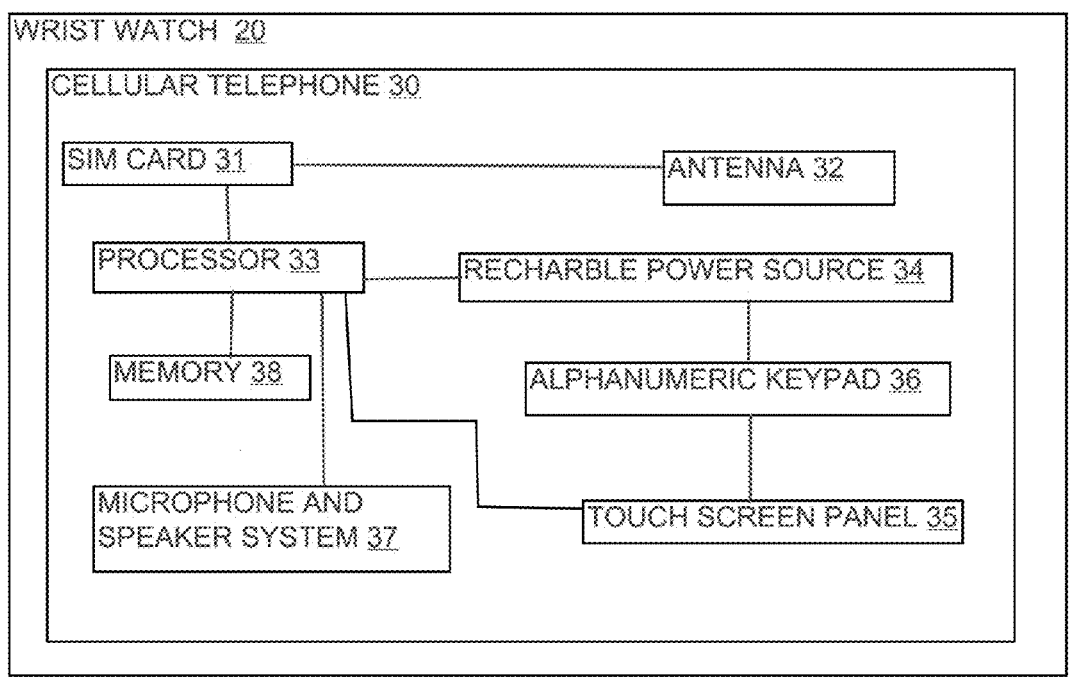
FIG. 3 is a high level schematic block diagram showing the interrelationship between the major electronic components of the cellular telephone.
Figure 4:
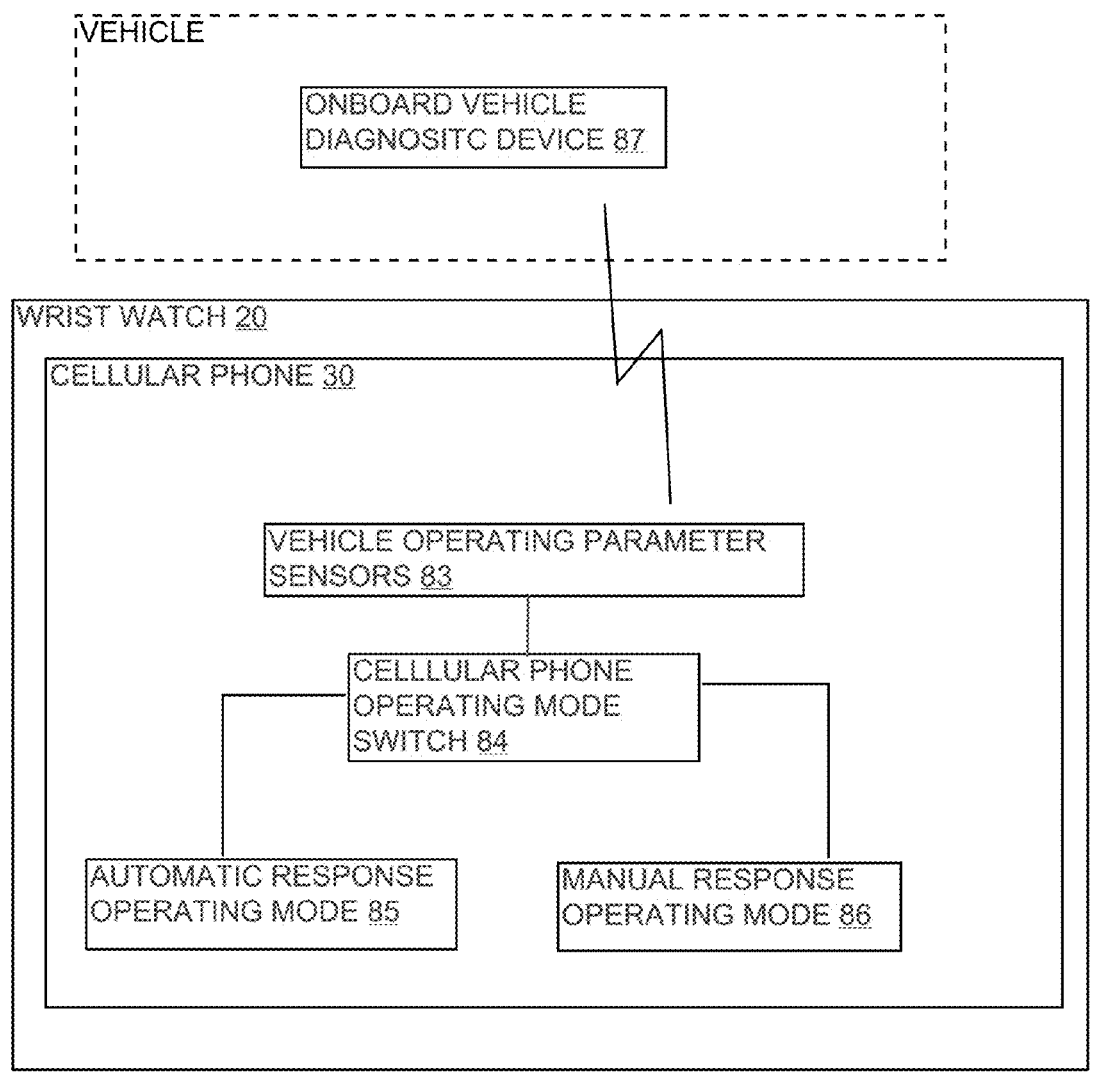
FIG. 4 is a high level schematic block diagram showing the interrelationship between the major electronic components of the cellular telephone in communication with a vehicle's on-board diagnostic device.

Referring to FIGS. 1-4, in addition to the specific functions described, depending on a design of each hand phone manufacturer, the combined cellular telephone and wrist watch 10 disclosed by the embodiment(s) 10, 10' can be optionally built in with any one or more than two functions of Bluetooth, fast internet, text, data transmission, video conversation, camera, voice recording, audio-video playing, to meet market needs. The combined cellular telephone and wrist watch 10 including a wrist watch 20 having a housing 21 provided with a fixed and rigid shape, and a flexible wrist band 22 attached to the housing 21; and a cellular telephone 30 located at the housing 21 and spaced from the wrist band 22.

In a non-limiting exemplary embodiment, the cellular telephone 30 includes a processor 33 located at the housing 21, a SIM card 31 communicatively coupled to the processor 33 and located within the housing 21, an antenna 32 communicatively coupled to the SIM card 31 and located at the housing 21, a rechargeable battery 34 communicatively coupled to the processor 33 and located at the housing 21, a touch screen 35 communicatively coupled to the processor 33 and located at the housing 21, an alphanumeric keypad 36 communicatively coupled to the touch screen 35 and located at the housing 21, and a microphone and speaker 37 system which communicatively coupled to the processor 33 and located at the housing 21.

In a non-limiting exemplary embodiment, the cellular telephone further includes a plurality of vehicle operating parameter sensors 83 adapted to be in communication with an existing onboard vehicle diagnostic device 87, and a cellular telephone 30 operating mode switch 84 in communication with the vehicle operating parameter sensors 83. A fastener 23 such as an elastic hook, clip, band, etc. may be removably attached to a side of the wrist watch 20 for permitting the combined cellular telephone and wrist watch 10 to be removably attached to a support surface such as a belt, purse, back pack, etc.

In a non-limiting exemplary embodiment, the cellular telephone 30 further includes a memory 38 in communication with the processor 33 and including a computer-executable control logic algorithm for blocking outgoing calls and texts when a user wearing the combined cellular telephone and wrist watch 10 is located within a vehicle having certain operating parameters. Such a control logic algorithm includes the chronological steps of: the vehicle operating parameter sensors 83 detecting, from the vehicle diagnostic detection device 87, whether an engine of the vehicle is on or off; the vehicle operating parameter sensors 83 detecting, from the vehicle diagnostic detection device 87, whether the vehicle is in a parked gear; if the vehicle engine is off, the sensors 83 generating and transmitting a first signal to the cellular telephone 30 operating mode switch 84 thereby toggling the cellular telephone 30 to a manual response operating mode 86; and if the vehicle engine is on and the vehicle is in the parked gear, the sensors 83 generating and transmitting the first signal to the cellular telephone 30 operating mode switch 84 thereby toggling the cellular telephone 30 to the manual response operating mode 86; and if the vehicle engine is on and the vehicle is not in the parked gear, the sensors 83 generating and transmitting a second signal to the cellular telephone 30 operating mode switch 84 thereby toggling the cellular telephone 30 to an automatic response operating mode 85. In this manner, a user of the cellular telephone 30 is permitted to selectively generate, send and receive text and telephone messages while the cellular telephone 30 is at the manual response operating mode 86. Conversely, a user of the cellular telephone 30 is prohibited from selectively generating, sending and receiving text and telephone messages while the cellular telephone 30 is at the automatic response operating mode 85.

The present disclosure further includes a method of utilizing a combined cellular telephone and wrist watch 10, the method including the chronological steps of: providing a wrist watch 20 including a housing 21 having a fixed and rigid shape, and a flexible wrist band 22 attached to the housing 21; providing and locating a cellular telephone 30 at the housing 21; and spacing the cellular telephone 30 from the wrist band 22.

In a non-limiting exemplary embodiment, when phone or text communication is received by the combined wrist watch and cellular telephone 10, settings of the phone or text communication may be set to respond to SMS text communications, email text communications, or other text communications received by the combined wrist watch and cellular telephone 10. When an incoming communication is received, the device 10 executes commands to interrupt the communication and send the communication to the device's 10 voice messaging system or to an alternate voice/text communication device that alerts the correspondent of a driving condition. The correspondent can then record a text communication on the voice/text cellular telephone 30 to be returned when the user is not driving.

Similarly to the incoming communication, when a phone or text communication is received, the device 10 checks to see if the correspondent is a distinctive correspondent or if the same user is sending several consecutive text communications. For those users that are labeled as distinctive, the device 10 responds with a return text communication indicating the user is otherwise occupied or is driving and cannot respond. For those correspondents that not labeled as distinctive, no action is taken, as the device 10 has already responded with one text communication and several follow on text communications would be redundant. After a given a time interval, the device 10 resets the tracking of correspondents such that the same correspondent can be defined as distinctive after a given interval between sent text communication.

Device 10 is not capable of being in selective manual operation within a vehicle when a correspondent is attempting to communicate a phone or text communication to the driving user who is wearing the wrist watch 20. When received, the device 10 sends a non-selective (pre-defined) automatic return text communication through a network, such as a cellular network, back to the correspondent's device. The return text communication sent to the correspondent alerts her that the intended recipient is driving and cannot answer the communication or read the text communication. It is desired to allow the device 10 to be tailored to the user's preferences, including defining the return text communication, how to handle incoming communications (e.g. distinctive voice, mail, or text communication, etc.), and defining what types of text communications to return at all.

In a non-limiting exemplary embodiment, the control logic algorithm locks the screen of the combined cellular phone and wrist watch 10 and responds automatic communication to incoming phone or text communications. This prevents users from engaging in any cell mobile activity while driving, thereby reducing the number of distracted-driving accidents and fatalities. The device 10 is ideal for parents who want to monitor their teenage sons and daughters while driving, or for anyone else simply looking for a safe way to drive.

In a non-limiting exemplary embodiment, within the housing 21 is an integrated circuit having a processor 33, a memory 38, and a storage. The processor 33 is preferably a central processing unit (CPU) that executes the commands stored within storage for accomplishing the tasks of recognizing the wireless device 10 is connected and thereafter executing the steps of the control logic algorithm in which the combined cellular telephone and wrist watch screen 35 is locked, its notifications are stopped, and incoming messages and calls are diverted and responded to automatically.

In a non-limiting exemplary embodiment, the combined cellular telephone and wrist watch 10 preferably includes its own circuit and dedicated electrical components for operation as a phone and as a smartphone. The present system as shown in the housing 21 is adapted to coordinate with the wrist watch 20 for executing the commands that cease the distracting features of the cellular telephone 30 while the user is driving.

The non-limiting exemplary embodiment(s) is/are referred to generally in the figures and are intended to provide a cellular telephone, cleverly incorporated into the design of a wearable wristwatch (collectively at 10). A pendent style 10' is also considered. Equipped with a rapid message delivery system, as well as other practical features, the design intent is to provide a multifunctional time piece which would enable consumers a discreet, yet readily available means of monitoring their cellular activity and communicating with others. It should be understood that the exemplary embodiment may be used with many different types of cellular telephones and watch design, and should not be limited to any particular cellular telephone 30 and wrist watch 20 design described herein.

Referring to the figures in general, in a non-limiting exemplary embodiment, cellular telephone, cleverly incorporated into the design of a wearable watch, with the device 10 designed to vibrate and emit an illuminated glow should the user miss a call, text or other important cellular data. As such, the wearer could discreetly monitor their cellular activity, without calling attention to themselves or disturbing others. Designed to also function as a watch, the combined cellular telephone and wrist watch 10 would be offered in circular or rectangular shaped versions, with the unit casing comprised of shatterproof plastic or plated metal material inside of which the electronic components necessary for powering the device 10 would be housed. Designs offered in the combined cellular telephone and wrist watch 10 could be configured to be worn about the wrist and attached to a stylish watch band 22, or worn about the neck and secured to an elegant chain. In the case of the former, the band 22 could be manufactured of plastic, suede or leather material, while pendant versions could feature chains manufactured of plated metal, gold, silver or even platinum, to name a few considerations. The actual time piece could feature either an analog or digital display that would be programmed with the exact time including hour, minute and second.

Housed within the unit housing 21 would be the electronic components required to operate to the unit. As with traditional cellular telephones, these components would include but are not limited to: the cellular telephone circuit board, SIM card 31, an antenna 32 and rechargeable battery 34. A touch screen 35 LCD (liquid crystal display) would be incorporated into the design of the time piece or positioned directly below. This touch screen 35 would boast an alphanumeric keypad 36 with which to send and receive calls, as well as an integrated microphone and speaker 37 system which would enable the user to offer voice commands or communicate, via combined cellular telephone and wrist watch 10.

This distinctive cellular telephone and wrist watch 10 would also boast smartphone technology, thus would feature a comprehensive address book, complete log of calls and texts, as well as could feature a variety of applications that enable the user to check their e-mail and access the internet, via their phone. An interactive calendar display would be included that would display the date and day of the week and could also be programmed to remind the user of their personal schedule, special events or other appointments. The combined cellular telephone and wrist watch 10 would also boast a safety application to be activated when the user is operating a motor vehicle. This feature would send out an automatic response to those calling or texting the user's phone, alerting them that user is driving and will return their call when they are no longer behind the wheel.

Notably, the combined cellular telephone and wrist watch 10 would boast a rapid response messaging system that instantly notifies the user in the event they receive a call or text by emitting a light and/or vibrating. Received messages and caller information would be logged and prominently displayed as they are received and for practical purposes, this display could boast a scrolling feed or comparable function, enabling the user to view an entire missed message or caller information at the touch of a button. This feature could be programmable, thus enabling the user to disable the feature if they are using their cell phone and activate it when the phone is turned off or set to a silent mode. Rotating and push button knobs would be positioned on either side of the unit for use in controlling the device's 10 various operational features including an on/off speaker switch, cell records database, phone book, files folder and other miscellaneous functions and features.

Use and application of combined cellular telephone and wrist watch 10 would be very simple and straightforward. Upon purchasing the unit, the user would program the unit with their personal information, or synch the phone with an existing phone in order to load an existing address book, planner and other important data instantly onto the combined cellular telephone and wrist watch 10. Once activated and programmed, the unit's time piece would display accurate information pertaining to the time and date and the unit's internal cellular telephone 30 would be ready for use. Securing the unit about the wrist in the same manner as a wrist watch 20 or wearing the unit around the neck, the user would then head off to their scheduled activities. If entering an important business meeting, enjoying a luncheon with friends or even working out at the gym, the user could activate combined cellular telephone and wrist watch 10 when they turn their cellular telephone 30 off or to silent mode. In this manner, should the user receive a text message or phone call, combined cellular telephone and wrist watch 10 would gently vibrate and the surface of the phone would emit a soft glow, alerting the user to this activity. The user could then simply glance at their combined cellular telephone and wrist watch 10 to read the text message or view information pertaining to the caller. If necessary, the user could then excuse themselves and return the text or call, or simply ignore the activity until it is a convenient and appropriate time for them to respond.

The combined cellular telephone and wrist watch 10 is an innovative product which would offer consumers a number of significant benefits and advantages. For example, the combined cellular telephone and wrist watch 10 would provide cellular telephone subscribers with a simple and effective means of monitoring their cellular activity at times when it is not polite or practical to use their phone. A specially designed cellular telephone, cleverly configured in the form of a wearable time piece, the combined cellular telephone and wrist watch 10 would prominently display information pertaining to missed phone calls and text messages, enabling the user to immediately respond if necessary. Sparing the user the embarrassment of keeping their phone turned on when engaged in a business meeting, attending a public event or working out at the gym, use of the combined cellular telephone and wrist watch 10 would allow the user to keep abreast of their cellular activity without disturbing others or being rude.

The inventor has noted that this feature could prove to be invaluable in matters of personal, or even national security, as with the combined cellular telephone and watch 10, everyone from a business professional, to a medical doctor, to even the President of the United States could be instantly notified and alerted to important information that demands immediate attention. Motorists should especially appreciate that with the combined cellular telephone and watch 10, they could monitor and/or block calls when driving, instantly sending a notification to callers and those sending text messages that the user is behind the wheel of a vehicle and will respond when it is safe to do so.

Featuring an integrated microphone and speaker 37 system, the combined cellular telephone and wrist watch 10 could be operated hands-free, thus providing those who suffer limited mobility or other physical maladies the convenience and safety of having a cellular telephone, without the physical exertion required to operate one manually. Further, because cellular information would be sent to the combined cellular telephone and wrist watch 10, users would be spared the hassle of carrying a traditional phone with them when it is not convenient. Whether jogging through the neighborhood or enjoying a family outing at the local water park, users would be able to keep track of their cellular activity, without being encumbered by a handheld cell phone. Constructed of durable, quality materials, this product should withstand years of continued use.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A combined cellular telephone and wrist watch, comprising:
    a wrist watch including
        a housing, and
        a wrist band attached to said housing; and
    a cellular telephone located at said housing and spaced from said wrist band;
    wherein said cellular telephone comprises
    a processor located at said housing;
    a SIM card communicatively coupled to said processor and located within said housing;
    an antenna communicatively coupled to said SIM card and located at said housing;
    a rechargeable battery communicatively coupled to said processor and located at said housing;
    a touch screen panel communicatively coupled to said processor and located at said housing;
    an alphanumeric keypad communicatively coupled to said touch screen panel and located at said housing;
    a microphone and speaker system which communicatively coupled to said processor and located at said housing;
    a plurality of vehicle operating parameter sensors adapted to be in communication with an existing onboard vehicle diagnostic device;
    a cellular telephone operating mode switch in communication with said vehicle operating parameter sensors; and
    a memory in communication with said processor and including a computer-executable control logic algorithm for blocking outgoing calls and texts when a user wearing said combined cellular telephone and wrist watch is located within a vehicle having certain operating parameters, said control logic algorithm including the chronological steps of:
    said vehicle operating parameter sensors detecting, from the vehicle diagnostic detection device, whether an engine of the vehicle is on or off;
    said vehicle operating parameter sensors detecting, from the vehicle diagnostic detection device, whether the vehicle is in a parked gear;
    if the vehicle engine is off, said sensors generating and transmitting a first signal to said cellular telephone operating mode switch thereby toggling said cellular telephone to a manual response operating mode; and
    if the vehicle engine is on and the vehicle is in the parked gear, said sensors generating and transmitting said first signal to said cellular telephone operating mode switch thereby toggling said cellular telephone to said manual response operating mode; and
    if the vehicle engine is on and the vehicle is not in the parked gear, said sensors generating and transmitting a second signal to said cellular telephone operating mode switch thereby toggling said cellular telephone to an automatic response operating mode;
    wherein a user of said cellular telephone is permitted to selectively generate, send and receive text and telephone messages while said cellular telephone is at said manual response operating mode;
    wherein a user of said cellular telephone is prohibited from selectively generating, sending and receiving text and telephone messages while said cellular telephone is at said automatic response operating mode.

2. A combined cellular telephone and wrist watch, comprising:
- a wrist watch including
  - a housing having a fixed and rigid shape, and
  - a flexible wrist band attached to said housing; and
- a cellular telephone located at said housing and spaced from said wrist band;
- wherein said cellular telephone comprises
- a processor located at said housing;
- a SIM card communicatively coupled to said processor and located within said housing;
- an antenna communicatively coupled to said SIM card and located at said housing;
- a rechargeable battery communicatively coupled to said processor and located at said housing;
- a touch screen panel communicatively coupled to said processor and located at said housing;
- an alphanumeric keypad communicatively coupled to said touch screen panel and located at said housing;
- a microphone and speaker system which communicatively coupled to said processor and located at said housing;
- a plurality of vehicle operating parameter sensors adapted to be in communication with an existing onboard vehicle diagnostic device;
- a cellular telephone operating mode switch in communication with said vehicle operating parameter sensors; and
- a memory in communication with said processor and including a computer-executable control logic algorithm for blocking outgoing calls and texts when a user wearing said combined cellular telephone and wrist watch is located within a vehicle having certain operating parameters, said control logic algorithm including the chronological steps of:
- said vehicle operating parameter sensors detecting, from the vehicle diagnostic detection device, whether an engine of the vehicle is on or off;
- said vehicle operating parameter sensors detecting, from the vehicle diagnostic detection device, whether the vehicle is in a parked gear;
- if the vehicle engine is off, said sensors generating and transmitting a first signal to said cellular telephone operating mode switch thereby toggling said cellular telephone to a manual response operating mode; and
- if the vehicle engine is on and the vehicle is in the parked gear, said sensors generating and transmitting said first signal to said cellular telephone operating mode switch thereby toggling said cellular telephone to said manual response operating mode; and
- if the vehicle engine is on and the vehicle is not in the parked gear, said sensors generating and transmitting a second signal to said cellular telephone operating mode switch thereby toggling said cellular telephone to an automatic response operating mode;
- wherein a user of said cellular telephone is permitted to selectively generate, send and receive text and telephone messages while said cellular telephone is at said manual response operating mode;
- wherein a user of said cellular telephone is prohibited from selectively generating, sending and receiving text and telephone messages while said cellular telephone is at said automatic response operating mode.

3. A method of utilizing a combined cellular telephone and wrist watch, said method comprising the chronological steps of:
- providing a wrist watch including a housing having a fixed and rigid shape, and a flexible wrist band attached to said housing;
- providing and locating a cellular telephone at said housing; and
- spacing said cellular telephone from said wrist band;
- wherein said cellular telephone comprises
- a processor located at said housing;
- a SIM card communicatively coupled to said processor and located within said housing;
- an antenna communicatively coupled to said SIM card and located at said housing;
- a rechargeable battery communicatively coupled to said processor and located at said housing;
- a touch screen panel communicatively coupled to said processor and located at said housing;
- an alphanumeric keypad communicatively coupled to said touch screen panel and located at said housing;
- a microphone and speaker system which communicatively coupled to said processor and located at said housing;
- a plurality of vehicle operating parameter sensors adapted to be in communication with an existing onboard vehicle diagnostic device;
- a cellular telephone operating mode switch in communication with said vehicle operating parameter sensors; and
- a memory in communication with said processor and including a computer-executable control logic algorithm for blocking outgoing calls and texts when a user wearing said combined cellular telephone and wrist watch is located within a vehicle having certain operating parameters, said control logic algorithm including the chronological steps of:
- said vehicle operating parameter sensors detecting, from the vehicle diagnostic detection device, whether an engine of the vehicle is on or off;
- said vehicle operating parameter sensors detecting, from the vehicle diagnostic detection device, whether the vehicle is in a parked gear;
- if the vehicle engine is off, said sensors generating and transmitting a first signal to said cellular telephone operating mode switch thereby toggling said cellular telephone to a manual response operating mode; and
- if the vehicle engine is on and the vehicle is in the parked gear, said sensors generating and transmitting said first signal to said cellular telephone operating mode switch thereby toggling said cellular telephone to said manual response operating mode; and
- if the vehicle engine is on and the vehicle is not in the parked gear, said sensors generating and transmitting a second signal to said cellular telephone operating mode switch thereby toggling said cellular telephone to an automatic response operating mode;
- wherein a user of said cellular telephone is permitted to selectively generate, send and receive text and telephone messages while said cellular telephone is at said manual response operating mode;
- wherein a user of said cellular telephone is prohibited from selectively generating, sending and receiving text and telephone messages while said cellular telephone is at said automatic response operating mode.

* * * * *